(12) United States Patent
Avner et al.

(10) Patent No.: US 8,930,377 B2
(45) Date of Patent: Jan. 6, 2015

(54) SYSTEM AND METHODS THEREOF FOR MINING WEB BASED USER GENERATED CONTENT FOR CREATION OF TERM TAXONOMIES

(75) Inventors: Amit Avner, Herzliya (IL); Omer Dror, Tel Aviv (IL); Itay Birnboim, Tel Aviv (IL)

(73) Assignee: Taykey Ltd., Herzliya (IL)

( * ) Notice: Subject to any disclaimer, the term of this patent is extended or adjusted under 35 U.S.C. 154(b) by 262 days.

(21) Appl. No.: 13/050,515

(22) Filed: Mar. 17, 2011

(65) Prior Publication Data
US 2011/0238674 A1   Sep. 29, 2011

Related U.S. Application Data

(60) Provisional application No. 61/316,844, filed on Mar. 24, 2010.

(51) Int. Cl.
G06F 17/30    (2006.01)
(52) U.S. Cl.
CPC ............................. G06F 17/30734 (2013.01)
USPC .................. 707/748; 707/776; 707/E17.014; 707/E17.108
(58) Field of Classification Search
USPC .................................................. 707/748, 776
See application file for complete search history.

(56) References Cited

U.S. PATENT DOCUMENTS

| | | |
|---|---|---|
| 6,463,430 B1 | 10/2002 | Brady et al. |
| 6,523,021 B1 | 2/2003 | Monberg et al. |
| 7,035,864 B1 | 4/2006 | Ferrari et al. |
| 7,062,483 B2 | 6/2006 | Ferrari et al. |
| 7,389,252 B2 | 6/2008 | Robb et al. |
| 7,409,404 B2 | 8/2008 | Gates |
| 7,426,499 B2 | 9/2008 | Eder |
| 7,428,554 B1 | 9/2008 | Coberley et al. |
| 7,433,876 B2 | 10/2008 | Spivack et al. |
| 7,543,232 B2 | 6/2009 | Easton, Jr. et al. |
| 7,567,957 B2 | 7/2009 | Ferrari et al. |
| 7,617,184 B2 | 11/2009 | Ferrari et al. |

(Continued)

FOREIGN PATENT DOCUMENTS

| | | |
|---|---|---|
| JP | 2000305952 | 11/2000 |
| KR | 20090034052 | 4/2009 |
| KR | 20090068803 | 6/2009 |
| KR | 20090080822 | 7/2009 |

OTHER PUBLICATIONS

International Searching Authority, "International Search Report and Written Opinion" for the corresponding International Patent Application PCT/IL2011/028846; Date of Mailing: Sep. 28, 2011.

*Primary Examiner* — Shyue Jiunn Hwa
(74) *Attorney, Agent, or Firm* — M&B IP Analysts, LLC

(57) ABSTRACT

A system for creation of term taxonomies by mining web based user generated content according. The system includes a network interface enabling access to one or more data sources; a mining unit for collecting textual content from the one or more sources and generating phrases, the generated phrases include sentiment phrases and non-sentiment phrases; an analysis unit for generating at least associations between a non-sentiment phrase and a sentiment phrase based on the generated phrases, wherein an association between a non-sentiment phrase and at least one corresponding sentiment phrase is a taxonomy; and storing the taxonomies in a data warehouse storage connected to the network wherein responsive to a query the system provides a sentiment to a non-sentiment phrase provided in the query.

22 Claims, 4 Drawing Sheets

(56) References Cited

U.S. PATENT DOCUMENTS

| | | |
|---|---|---|
| 7,620,628 B2 | 11/2009 | Kapur et al. |
| 7,890,382 B2 | 2/2011 | Robb et al. |
| 2005/0091200 A1 | 4/2005 | Melton et al. |
| 2007/0106627 A1 | 5/2007 | Srivastava et al. |
| 2007/0143296 A1 | 6/2007 | Casion |
| 2007/0192300 A1 | 8/2007 | Reuther et al. |
| 2007/0276676 A1 | 11/2007 | Hoenig et al. |
| 2008/0027769 A1 | 1/2008 | Eder |
| 2008/0052630 A1 | 2/2008 | Rosenbaum et al. |
| 2008/0082463 A1 | 4/2008 | Cheng et al. |
| 2008/0109285 A1 | 5/2008 | Reuther et al. |
| 2008/0133488 A1* | 6/2008 | Bandaru et al. .............. 707/3 |
| 2008/0243531 A1 | 10/2008 | Hyder et al. |
| 2008/0263589 A1 | 10/2008 | Jacobson et al. |
| 2008/0281915 A1 | 11/2008 | Elad et al. |
| 2009/0113468 A1 | 4/2009 | Steelberg et al. |
| 2009/0164400 A1 | 6/2009 | Amer-Yahia et al. |
| 2009/0164897 A1 | 6/2009 | Amer-Yahia et al. |
| 2009/0216581 A1* | 8/2009 | Carrier et al. .............. 705/7 |
| 2010/0262454 A1* | 10/2010 | Sommer et al. .............. 705/10 |

* cited by examiner

SYSTEM AND METHODS THEREOF FOR MINING WEB BASED USER GENERATED CONTENT FOR CREATION OF TERM TAXONOMIES

CROSS-REFERENCE TO RELATED APPLICATIONS

This application claims the benefit of U.S. provisional application No. 61/316,844 filed on Mar. 24, 2010, the contents of which are incorporated herein by reference.

TECHNICAL FIELD

The invention generally relates to the generation of taxonomies based on information available on the Internet, and more specifically to the generation of taxonomies with respect to a plurality of terms, particularly social terms, and respective sentiments and sentiment trends thereto.

BACKGROUND OF THE INVENTION

There is an abundance of information available on the Internet through content on web pages, social networks, as well as other sources of information, which are accessible via the world-wide web (WWW). Search systems make the access to such information speedy and generally cost effective. However, there are also certain disadvantages, one of which is the fact that even targeted searches to generally available information result in large amounts of 'hits' requiring the user to sift through a lot of unwanted information. The search is static by nature and over time, as more and more irrelevant data is available, the more difficult it is to get to meaningful information.

Various users of information are interested in more elaborate analysis of the information available through the Internet as well as the time-value of such information. That is, older information may be less important than newer information and the trends relating to the information may be more interesting than the data relating to the information at any given point in time. Current solutions monitor online behavior, rather than attempting to reach intents. For example, today advertisers attempting to target customers can merely do so based on where they go, what they do, and what they read on the web. For example, a user reading about the difficulties of a car manufacturer might be targeted for an advertisement to purchase that manufacturer's car, which would not necessarily be appropriate. In other words, today's available solutions are unable to distinguish this case from an article where the same company presents a new model of a car. Likewise, the prior art solutions are unable to correlate items appearing in such sources of information to determine any kind of meaningful relationship.

An ability to understand human trends dynamically as they are expressed would be of significant advantage to advertisers, presenters, politicians, chief executive officers (CEOs) and others who may have an interest in such deeper understanding of the information. Tools addressing such issues are unavailable today and it would be therefore advantageous to provide such tools.

SUMMARY OF THE INVENTION

Certain embodiments disclosed herein include a system for creation of term taxonomies by mining web based user generated content according. The system comprises a network interface enabling access to one or more data sources; a mining unit for collecting textual content from the one or more sources and generating phrases, the generated phrases include sentiment phrases and non-sentiment phrases; an analysis unit for generating at least associations between a non-sentiment phrase and a sentiment phrase based on the generated phrases, wherein an association between a non-sentiment phrase and at least one corresponding sentiment phrase is a taxonomy; and storing the taxonomies in a data warehouse storage connected to the network wherein responsive to a query the system provides a sentiment to a non-sentiment phrase provided in the query.

Certain embodiments disclosed herein also include a method for generating term taxonomies between textual phrases. The method comprises crawling one or more data sources by an agent operative on a computing device to collect textual content from the one or more data sources; performing phrase extraction using the textual content to generate phrases; identifying sentiment phrases and non-sentiment phrases from the generated phrases; associating a sentiment phrase with at least a non-sentiment phrase, to create at least taxonomy; and storing each non-sentiment phrase having a corresponding sentiment phrase in a data warehouse.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
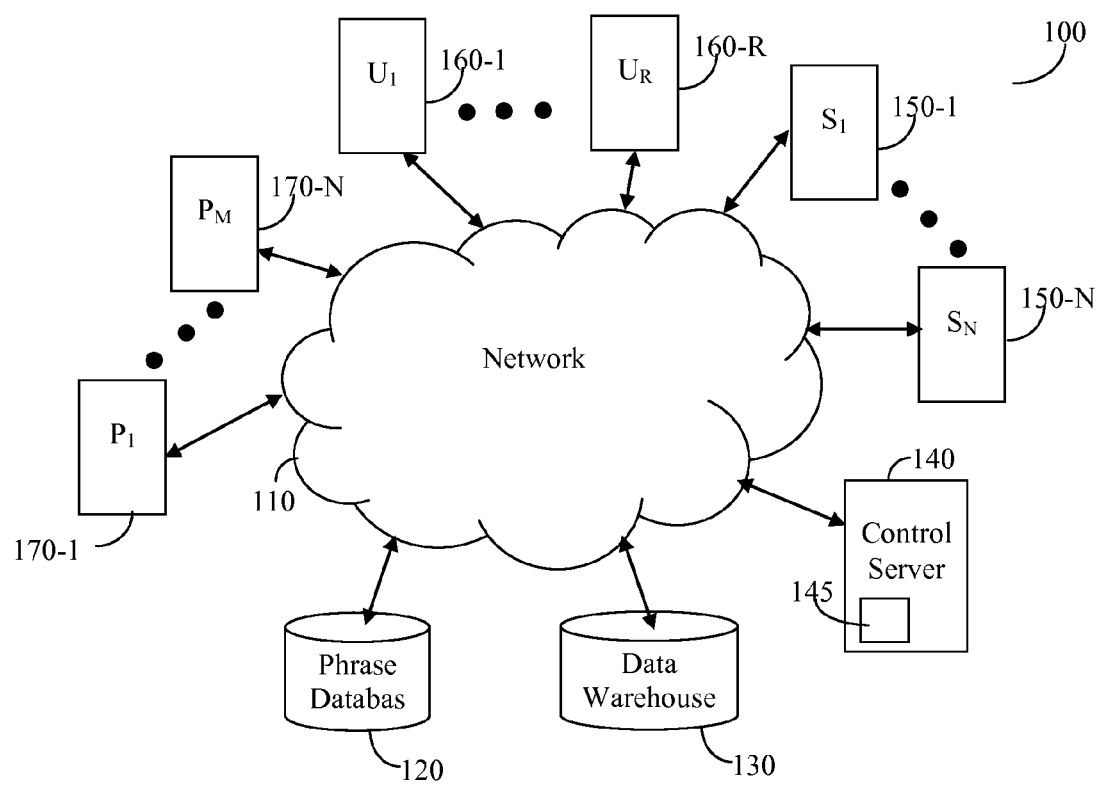
FIG. 1 is a schematic diagram of a system for creation of term taxonomies by mining web based user generated content according to an embodiment of the invention.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments allow for real-time crawling through user-generated content connect, for example, social networks on the web, analyzing the content and creating real-time taxonomies relative of terms found. Further, data respective of terms are collected and grouped the terms in usable forms. This includes crawling designated sources of content, such as social networks, and the creation of taxonomies of terms based, for example, on a predefined dictionary of terms of interest. The creation of such term taxonomies is of particular use with respect to advertisements and enabling the determination of relations between terms and strengths of such relationships.

FIG. 1 depicts an exemplary and non-limiting schematic diagram of a system 100 for creation of term taxonomies according to an embodiment of the invention. To a network 110 there are connected various components that comprise the system 100. The network 110 can be a local area network (LAN), a wide area network (WAN), a metro area network (MAN), the world wide web (WWW), the Internet, the likes, and combinations thereof.

A phrase database 120 is connected to the network 110 and contains identified phrases that are either preloaded to the phrase database 120 or, that were detected during operation of the system as such phrases, and as further explained in greater detail herein below. Phrases may contain, but are not limited to, terms of interest, brand names, and the like. A data warehouse 130 is also connected to the network 110, for storing processed information respective of phrases and as further explained in greater detail herein below. The operation of the system 100 is controlled by a control server 140 having executable code stored in a memory 145, such that the control server 140 may perform the tasks discussed in more detail herein below. The memory 145 may be any form of tangible memory.

While the processing may be performed using solely the control server 140, embodiments of the invention may include one or more processing units 170-1 through 170-M which allow for handling of the vast amount of information needed to be processed, without departing from the scope of the invention.

Also connected to the network 110 are one or more sources of information 150-1 through 150-M. These may include, but are not limited to, social networks, e.g., Facebook®, Twitter™, web pages, blogs, and other sources of textual information. Typically, a plurality of users using user nodes 160-1 though 160-R access the information sources 150-1 though 150-N periodically and provide their own comments and information therein. According to the teachings disclosed herein, it is these types and pieces of information that are used by the system 100 for its operation which is described in further detail with respect of FIG. 2. A user node 160-j (j= 1, . . . , R) is a computing device operated by a user and includes, but is not limited to, a personal computer, a smart phone, a mobile phone, a tablet computer, or any type of device that enables connectivity to the Internet.

Figure 2:
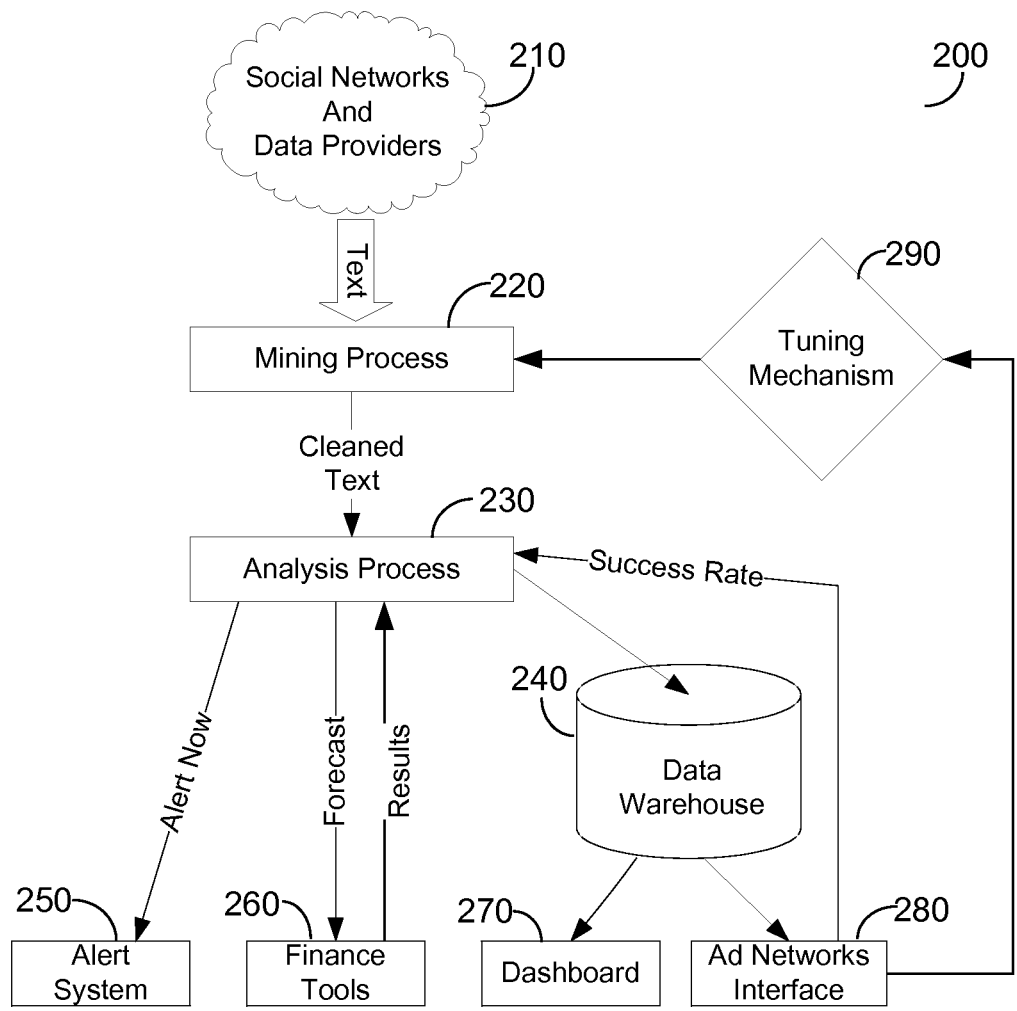
FIG. 2 is an overview block diagram of the operation of the system.

FIG. 2 shows an exemplary and non-limiting overview block diagram 200 of the operation of the system 100. One or more data sources 210, including, but not limited to, social networks and other user provided sources of information 210 are checked and or regularly supplied for text to be provided to a mining process 220. The access to the data sources 210 is thought the network 110 by means of a network interface (not shown). In an embodiment of the invention, the mining process 220 can be executed by a mining unit of the system 200.

The task of the mining process 220 is to extract from the text all irrelevant data that cannot be effectively used in the analysis that is performed by the system. Basically, the mining task is to identify sentiment phrases and non-sentiment phrases. In addition to sentiment extraction, the mining process 220 "cleans" the data collected. Sentiment phrases may include, but not by way of limitation, words such as "love", "hate", "great", "disaster", "beautiful", "ugly" and the like, but also "not good", "great time", "awfully good", and more. Cleaning of data may include phrases common in social networks such as, but of course not limited to, conversion of "GRREEEAT!" into "great" and so on. In addition, cleaning may include removing conjunctions and words that appear with extremely high frequency or are otherwise unknown or irrelevant. While single words have been shown here, multiple words grouped as a phrase may also be treated as a sentiment phrase, such as but not by way of limitation "great experience", "major issues", "looks great" and more. These words describe a sentiment typically applied to a non-sentiment phrase.

The text coming in from the one or more data source(s) 210 is mined for such phrases, for example, by using a reference for phrases stored in a database, such as the phrase database 120. The mining process includes understanding that a complex phrase such as "I hate I Love Lucy" actually contains a sentiment phrase "love" and a non-sentiment phrase "I Love Lucy", where the word "love" in the non-sentiment phrase is not to be analyzed as a standalone phrase. Furthermore, the sentence "I saw the movie I love Lucy" does not comprise any sentiment phrase, and therefore would not cause the system to associate a sentiment phrase to the non-sentiment phrase. The phrases database 120, in one embodiment, is a preloaded database and updated periodically. However, it is also possible to automatically update the phrase database 120 upon detection of a phrase as being either one of a sentiment phrase or a non-sentiment phrase. Furthermore, a sentiment phrase within a non-sentiment phrase is ignored for this purpose as being a sentiment phrase and is only treated as part of the non-sentiment phrase. It should therefore be understood that a taxonomy is created by association of a non-sentiment phrase with a sentiment phrase. Hence, for example, in the context of the phrase "I hate I Love Lucy" the sentiment phrase is "hate", the non-sentiment phrase is "I Love Lucy" and associated together in accordance with the principles of the invention to create a taxonomy.

According to another embodiment of the invention, a comparative numerical value is associated with each sentiment. For example, the word "love" may have a score of "10", the word "indifferent" the score of "0" and "hate" the score of "−10". Hence, positive sentiments would result in a positive score while negative sentiments would result in a negative score. Such score associations may be performed initially manually by a user of the system, but over time the system 100, based on a feedback provided by, e.g., a tuning mechanism 290, can position the sentiment phrases relative to each other to determine an ever changing score value to every sentiment phrase. This is of high importance as language references change over time and references which may be highly positive can become negative or vice versa, or decline or incline as the case may be. This can be achieved by aggregation of sentiments with respect to a specific non-sentiment phrase resulting in a taxonomy that reflects the overall sentiment to the non-sentiment phrase.

In an embodiment of the invention, a weighted sentiment score corresponding to a plurality of sentiment phrases collected for a respective non-sentiment phrase is generated. That is, within a specific context, the plurality of sentiments associated with a non-sentiment phrase are collected, and then an aggregated score is generated. The aggregated score may be further weighted to reflect the weight of each of the individual scores with respect to other scores.

The cleaned text that contains the phrases is now processed using an analysis process 230 which in an embodiment of the invention is performed by an analysis unit of the system 200. The analysis may provide based on the type of process information needed, the likes of alerts and financial information. An alert may be sounded by an alert system 250 if it is determined that a certain non-sentiment phrase, for example, a certain brand name, is increasingly associated with negative sentiment phrases. This may be of high importance as the manufacturer associated with the brand name would presumably wish to act upon such negative information as soon as possible in real-time. Likewise, a positive sentiment association may be of interest for either supporting that sentiment by certain advertising campaigns to further strengthen the brand name, or by otherwise providing certain incentives to consumers of products of the brand name. Those of ordinary skill in the art would readily realize the opportunities the system 100 and embodiment 200 provide.

Returning to FIG. 2, the analyzed data is stored in a data warehouse 240, shown also as data warehouse 130 in FIG. 1. Through a dashboard utility 270 it is possible to provide queries to the data warehouse 240. An advertisement network interface 280 further enables advertising related management, for example providing advertisements relative to specific phrases used. In addition, the information is tuned by a tuning mechanism 290 thereby allowing for feedback to enable better mining of the data by the mining process 220. In the case of an advertisement a success rate, for example conversion rates, is also provided to the analysis process 230 for better analysis of the cleaned text by creating real time taxonomies.

An analysis may further include grouping and classification of terms in real-time, as they are collected by the system. Furthermore, current trends can be analyzed and information thereof provided, including, without limitation, an inclining trend and a declining trend with respect to the sentiment phrase associated with a non-sentiment phrase. Moreover, using the analysis process 230 it is possible to detect hidden connections, i.e., an association between non-sentiment phrases that have a correlation. For example, if a web site of a talk show refers more positively or more frequently to a brand name product, the system 100 through its phrase analysis is able to find the correlation between the non-sentiment phrases and then compare the sentiment phrases thereof. That way, if the talk show web site tends to favor and recommend the brand name product it would make more sense to spend, for example, advertisement money there, than if the sentiment phrase would be a negative one.

Figure 3:
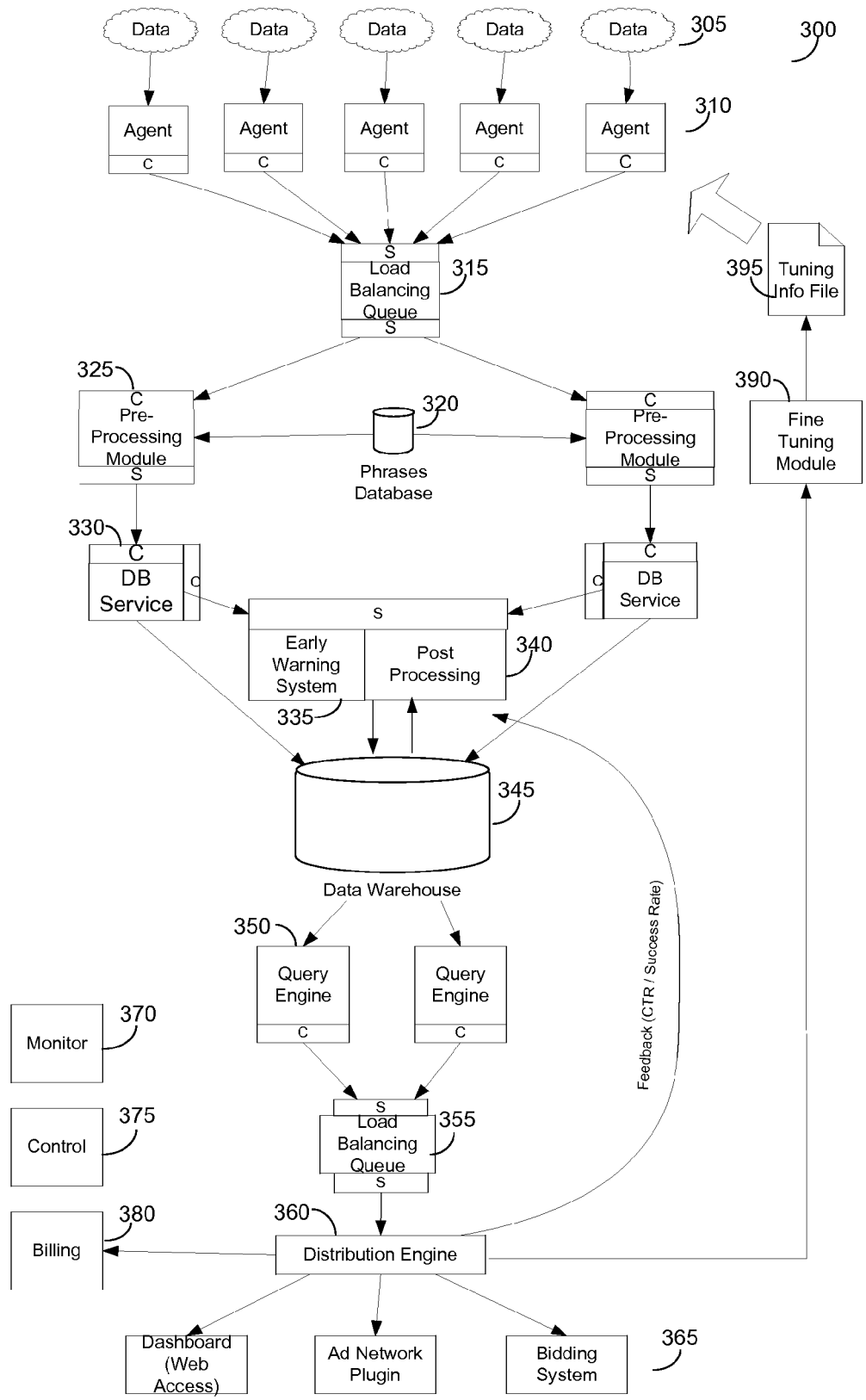
FIG. 3 is a detailed block diagram of the operation of the system depicted in FIGS. 1 and 2 according to an embodiment of the invention.

FIG. 3 shows an exemplary and non-limiting detailed block diagram of the operation of a system 300 according to the principles of the invention. Data sources 305, including the web sites and web services like of Facebook® and Twitter™, but not limited thereto, are probed periodically by agents 310 of the system 300. The agents 310, in one embodiment, are operative under the control of the control server 140 or on any one of the processing units 170, when applicable. A load balancing queue 315, operative for example on the control server 140, balances the loads of the agents 310 on the execution units such that their operation does not overload any such unit. In the exemplary and non-limiting implementation, two processing paths are shown, however, more may be used as may be necessary.

In one embodiment, the loading of an agent 310 is also a function of the periodic checking of the respective data source 305. Each processing unit, for example, processing units 170, performs a preprocessing using the preprocessing module 325. The preprocessing, which is the mining of phrases as explained hereinabove, is performed respective of a phrase database 370 to which such processing units 170 are coupled to by means of the network 110. A database service utility 330, executing on each processing node 170, stores the phrases in the data warehouse 345, shown in FIG. 1 as the data warehouse 130. An early warning system 335, implemented on one of the processing units 170 or on the control server 140, is communicatively connected with the database service utility 350, and configured to generate early warning based on specific analysis. For example, an increase of references to a brand name product above a threshold value may result in an alarm. In one embodiment, this happens only when the source of such an increase is a specific source of interest. This is done because some sources 305 are more meaningful for certain non-sentiment phrases than others, and furthermore, some sentiment phrases are more critical when appearing in one source 305 versus another.

The second portion of the system 300 depicted in FIG. 3, concerns the ability to query the data warehouse 345 by one or more query engines 350, using a load balancing queue 355 as may be applicable. The queries may be received from a plurality of sources 365 including, but not limited to, a dashboard for web access, an advertisement network plugin, and a bidding system. The sources 365 are connected to a distribution engine that receives the queries and submits them to the load balancing queue 355 as well as distributing the answers received thereto. The distribution engine further provides information to a fine tuning module, executing for example on the control server 140, and then to an exemplary and non-limiting tuning information file 395. Other subsystems such as a monitor 370 for monitoring the operation of the system 300, a control 375, and a billing system may all be used in conjunction with the operation of the system 300.

Figure 4:
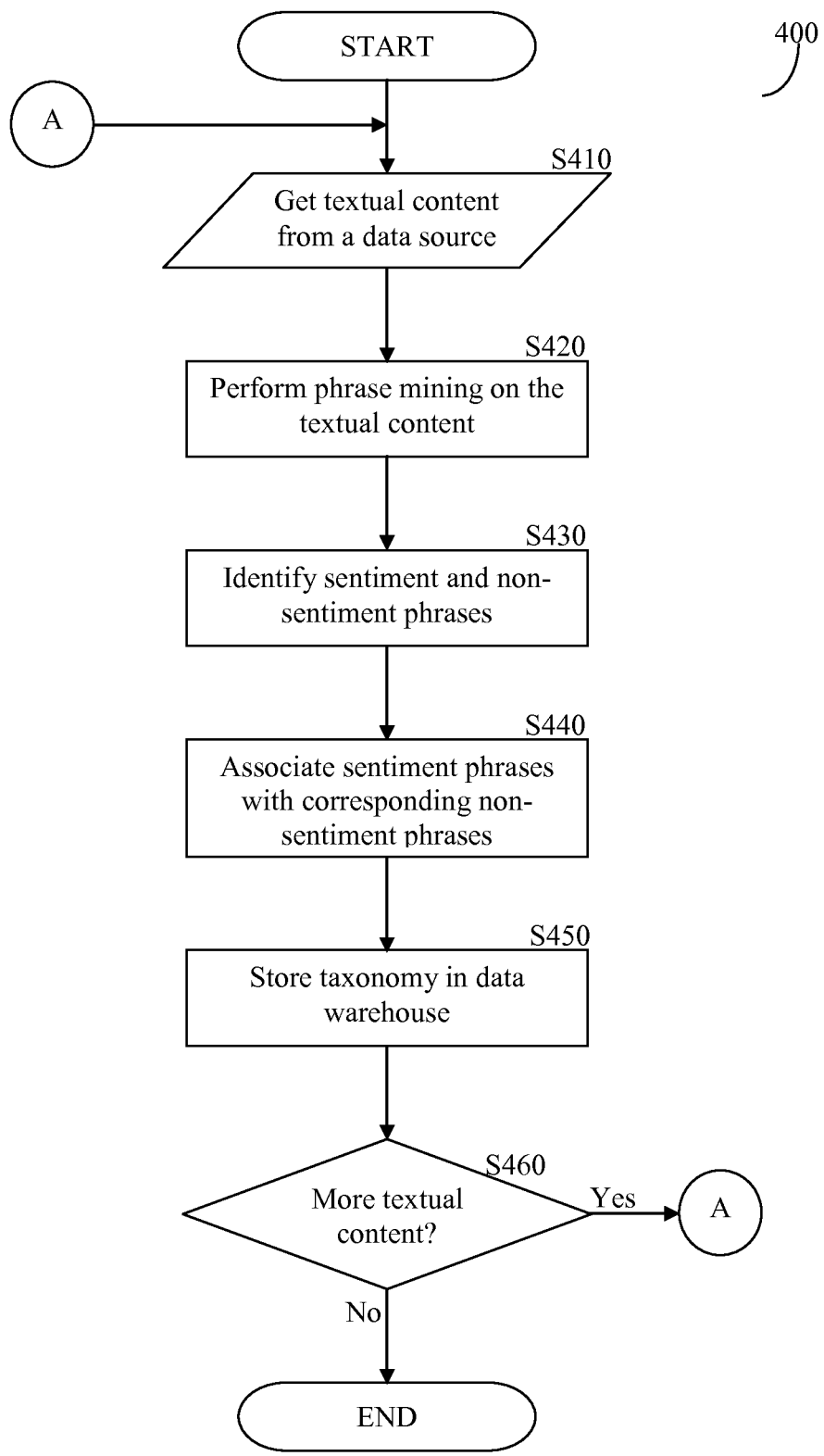
FIG. 4 is a flowchart describing a method for creation of term taxonomies by mining web based user generated content according to an embodiment of the invention.

FIG. 4 shows an exemplary and non-limiting flowchart 400 a method for creation of term taxonomies. In S410 the system, for example and without limitations, anyone of the systems 100, 200 and 300 described hereinabove, receives textual content from one or more information sources. As shown above this can be performed by using the agents 310. In S420, phrase mining is performed. The phrase mining includes at least the detection of phrases in the received content and in S430 identification and separation of sentiment and non-sentiment phrases. In S440, sentiment phrases are associated with non-sentiment phrases as may be applicable. In S450, the taxonomies created by association of sentiment phrases to their respective non-sentiment phrases, including by, but not limited to, aggregation of sentiment phrases with respect to a non-sentiment phrase. The created taxonomies then are stored, for example, in the data warehouse 130. This enables the use of the data in the data warehouse by queries as also discussed in more detail hereinabove. In S460, it is checked whether additional text content is to be gathered, and if so execution continues with S410; otherwise, execution terminates.

In an embodiment of the method described herein, an analysis takes place to determine the likes of current trends respective of the non-sentiment phrases based on their sentiment phrases, prediction of future trends, identification of hidden connections and the like.

The principles of the invention are implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system for creation of term taxonomies by mining web-based user generated content, comprising:
    a network interface enabling access to one or more sources of information connected to a network;
    a mining unit for collecting textual content from the one or more sources of information and generating phrases, the mining unit is further configured to identify in the generated phrases sentiment phrases and non-sentiment phrases based on a semantic meaning and context of each of the generated phrases in the collected textual content, each of the identified sentiment phrases includes one or more words describing a sentiment, the sentiment being any one of a positive sentiment, a neutral sentiment, and a negative sentiment, each of the positive sentiment, the neutral sentiment, and the negative sentiment is associated with a different score, wherein each of the generated sentiment phrases includes one or more words that do not describe a sentiment, wherein a sentiment phrase within a non-sentiment phrase is a non-sentiment phrase;
    wherein the mining unit is further configured to perform a cleaning process on the identified sentiment phrases and non-sentiment phrases, wherein the cleaning process includes at least conversion of common misspelled phrases that appear in the textual content;
    an analysis unit for generating a plurality of term taxonomies, wherein the analysis unit is configured to generate a term taxonomy of the plurality of term taxonomies by creating at least associations between a non-sentiment phrase of the identified non-sentiment phrases and a sentiment phrase of the identified sentiment phrases, wherein an association between the non-sentiment phrase and the at least one corresponding sentiment phrase is a term taxonomy, wherein the analysis unit is further configured to provide a trend report respective of a term taxonomy of the generated term taxonomies;
    a non-transitory data warehouse storage medium connected to the network for storing the plurality of generated term taxonomies, wherein responsive to a query the system provides a sentiment of a non-sentiment phrase provided in the query; and
    an alert unit for generating an alert responsive of the trend report.

2. The system of claim 1, wherein the mining unit is connected to a phrase database containing identified non-sentiment phrases and sentiment phrases, wherein the mining unit further compares phrases in the textual content to phrases stored in the phrase database, wherein the phrase database further contains sentiment phrases having a corresponding score.

3. The system of claim 1, wherein the score is any one of:
    a negative score, a neutral score, and a positive score, wherein the negative score is a range of negative values and wherein the positive score is a range of positive values.

4. The system of claim 3, wherein the score is initially assigned by a user of the system and adaptively adapted by a tuning mechanism.

5. The system of claim 4, wherein the tuning mechanism further provides a feedback to at least one of: the mining unit and the analysis unit.

6. The system of claim 1, wherein the mining unit computes a weighted sentiment score corresponding to a plurality of sentiment phrases collected for a respective non-sentiment phrase, wherein the weighted sentiment score is indicative of any one of the positive sentiment, the neutral sentiment, and the negative sentiment.

7. The system of claim 1, wherein the analysis unit further correlates at least two non-sentiment phrases.

8. The system of claim 7, wherein the analysis unit further compares a sentiment between the at least two non-sentiment phrases.

9. The system of claim 1, wherein the alert unit is further configured to generates the alert responsive of at least one of: a trend detected from the trend report and a crossing of a threshold determined from the trend report.

10. The system of claim 1, wherein each of the one or more sources of information is any one of: a social network, a blog, and a web page.

11. The system of claim 1, wherein the common misspelled phrases are collected from a social network.

12. A method for generating term taxonomies between textual phrases, comprising:
    crawling one or more sources of information by an agent operative on a computing device to collect textual content from the one or more data sources;
    performing phrase extraction using the textual content to generate phrases;
    identifying sentiment phrases and non-sentiment phrases from the generated phrases, wherein the identification is based on a semantic meaning and context of each of the generated phrases in the collected textual content, wherein each of the identified sentiment phrases includes one or more words describing a sentiment, the sentiment being any one of a positive sentiment, a neutral sentiment, and a negative sentiment, each of the positive sentiment, the neutral sentiment, and the negative sentiment is associated with a different score, wherein each of the generated sentiment phrases includes one or more words that do not describe a sentiment, wherein a sentiment phrase within a non-sentiment phrase is a non-sentiment phrase;
    performing a cleaning process on the identified sentiment and non-sentiment phrases, wherein the cleaning process includes at least conversion of common misspelled phrases that appear in the textual content; associating a sentiment phrase with at least one non-sentiment phrase to create at least a term taxonomy; and
    storing the term taxonomy of each of the at least one non-sentiment phrase having a corresponding sentiment phrase in a data warehouse storage;
    generating a trend report respective of the term taxonomy of at least a sentiment phrase with respect of at least a non-sentiment phrase; and
    generating an alert responsive of the trend report.

13. The method of claim 12, wherein identifying the sentiment phrases and non-sentiment phrases further comprises:
comparing each of the generated phrases to sentiment phrases and non-sentiment phrases stored in a phrase database, wherein at least the sentiment phrase in the phrase database is associated with a score;
determining that a phrase is a sentiment phrase when a match is found between the phrase and one of the sentiment phrases stored in the phrase database; and
determining that a phrase is a non-sentiment phrase when a match is not found between the phrase and one of the sentiment phrases in the phrase database.

14. The method of claim 12, wherein the score is any one of: a negative score, a neutral score, and a positive score, wherein the negative score is a range of negative values and wherein the positive score is a range of positive values.

15. The method of claim 14, further comprising:
generating a weighted sentiment score corresponding to a plurality of sentiment phrases collected for a respective non-sentiment phrase.

16. The method of claim 12, further comprising:
correlating the non-sentiment phrase with at least another non-sentiment phrase.

17. The method of claim 16, wherein the correlated non-sentiment phrases are associated with the same sentiment phrase.

18. The method of claim 12, further comprising:
receiving a feedback for the purpose of tuning at least one of: generation of phrases, generation of sentiment phrases, generation of non-sentiment phrases, correlation of non-sentiment phrases, and scores corresponding to sentiment phrases in the phrase database.

19. The method of claim 12, wherein
generating the alert responsive of the trend report further comprising generating the alert responsive of at least one of: a trend detected from the trend report and a crossing of a threshold determined from the trend report.

20. The method of claim 12, wherein each of the one or more sources of information is at least one of: a social network, a blog, and a web page.

21. A non-transitory computer readable medium having stored thereon instructions for causing one or more processing units to execute the method according to claim 12.

22. The method of claim 12, wherein the common misspelled phrases are collected from a social network.

* * * * *